No. 733,164. PATENTED JULY 7, 1903.
A. CURRLE.
APPARATUS FOR WINDING FLAT STRIPS OF PASTE AND CUTTING SAME.
APPLICATION FILED MAY 16, 1902.
NO MODEL. 6 SHEETS—SHEET 3.
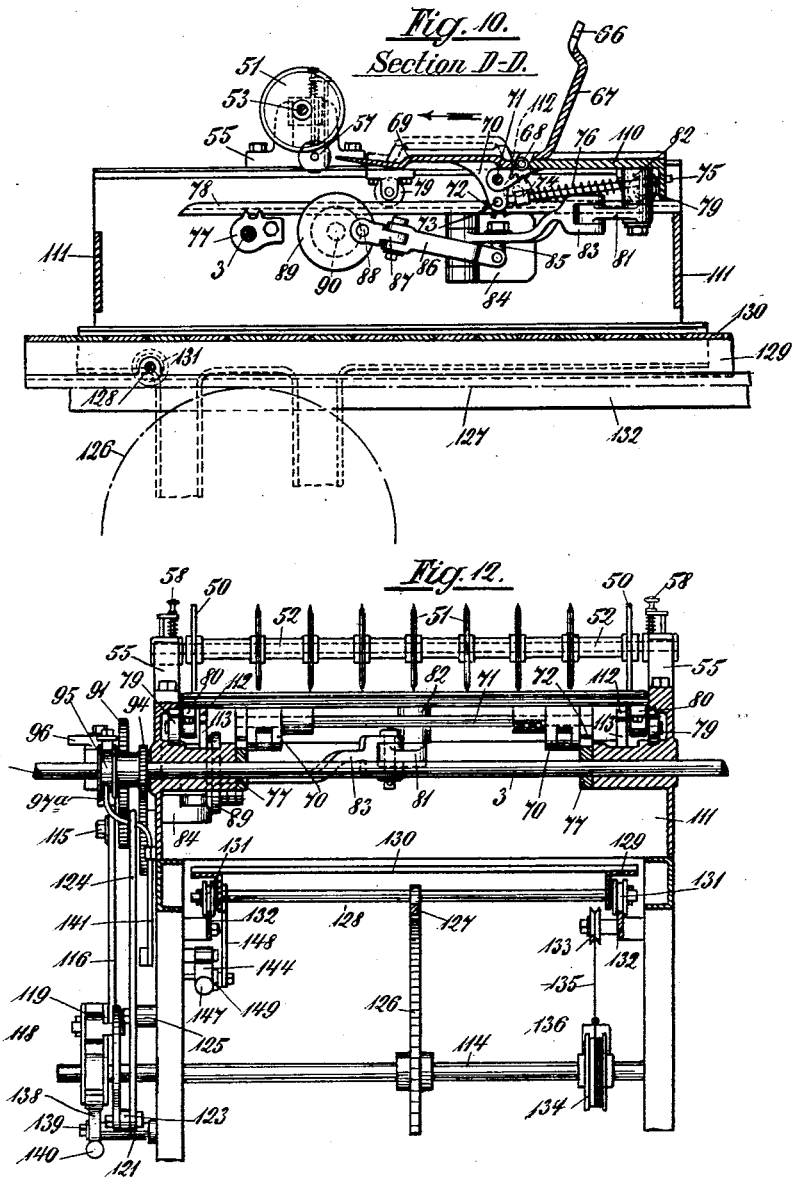
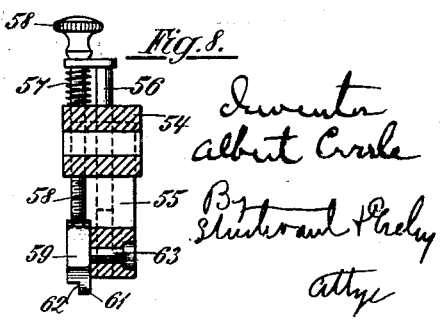

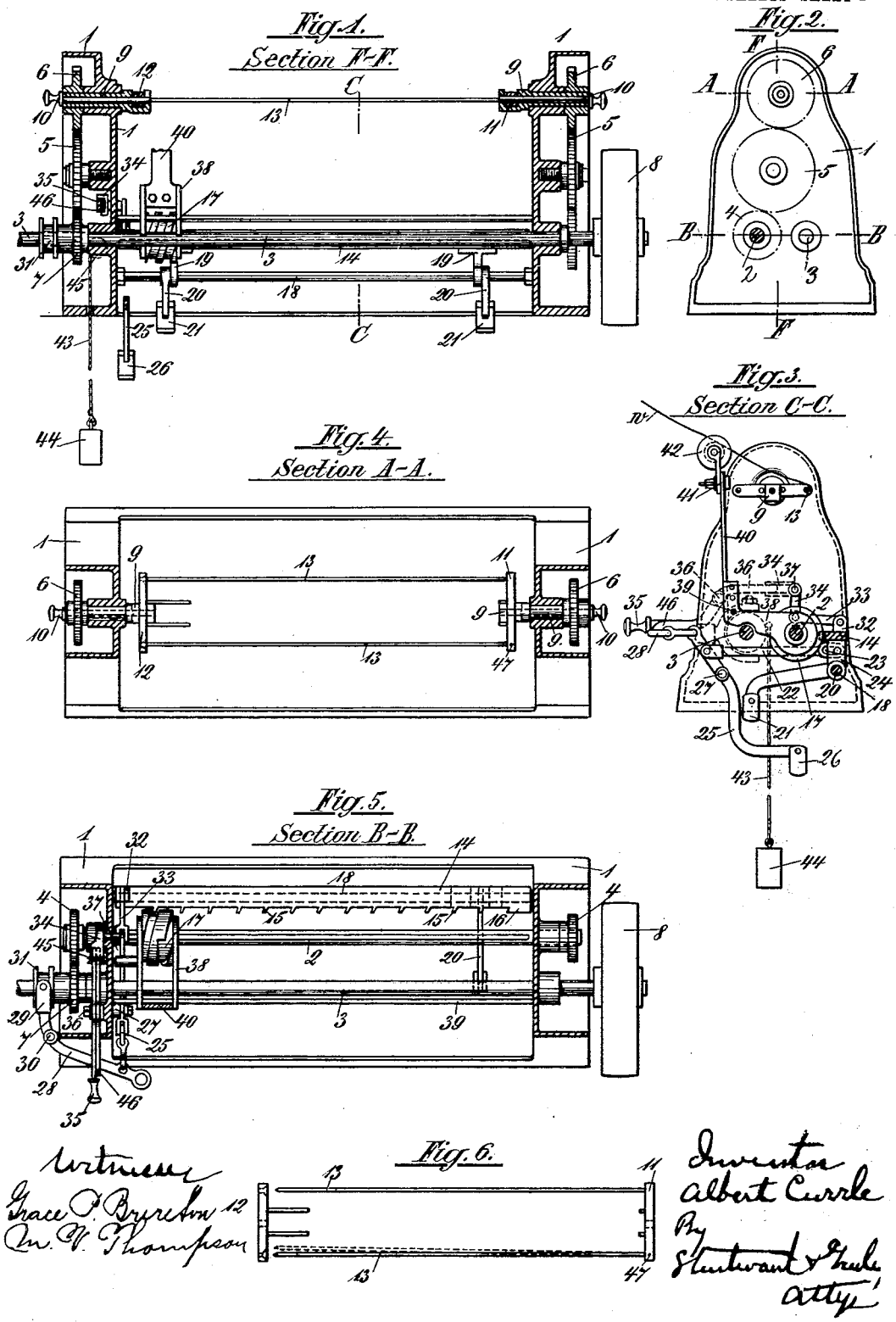

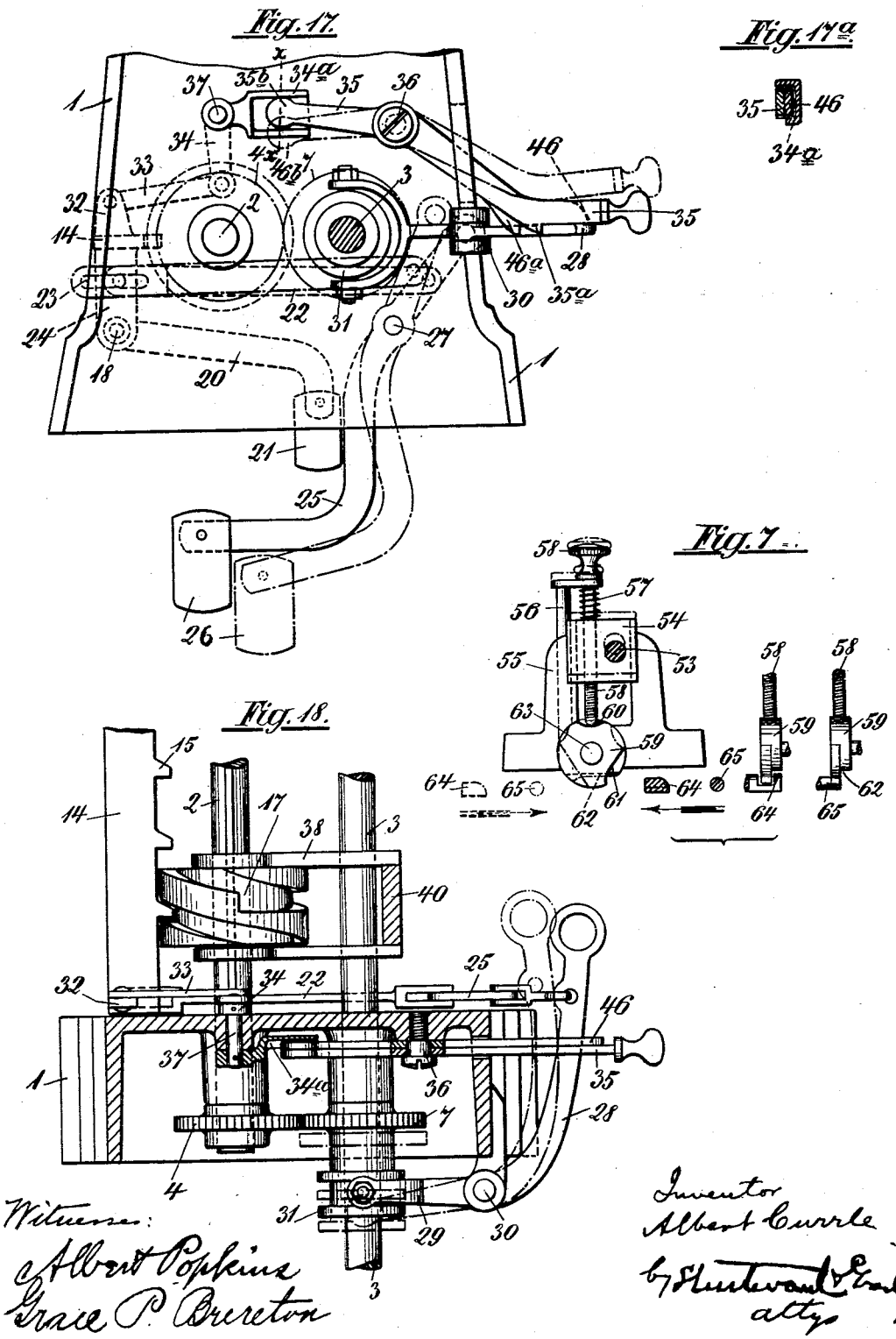

No. 733,164. PATENTED JULY 7, 1903.
A. CURRLE.
APPARATUS FOR WINDING FLAT STRIPS OF PASTE AND CUTTING SAME.
APPLICATION FILED MAY 16, 1902.
NO MODEL. 6 SHEETS—SHEET 4.
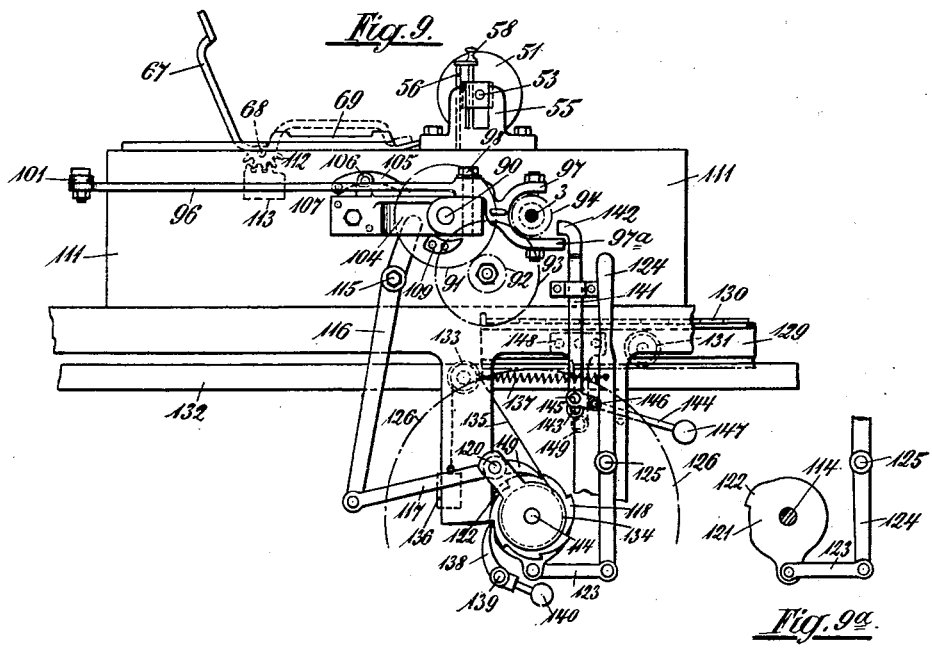
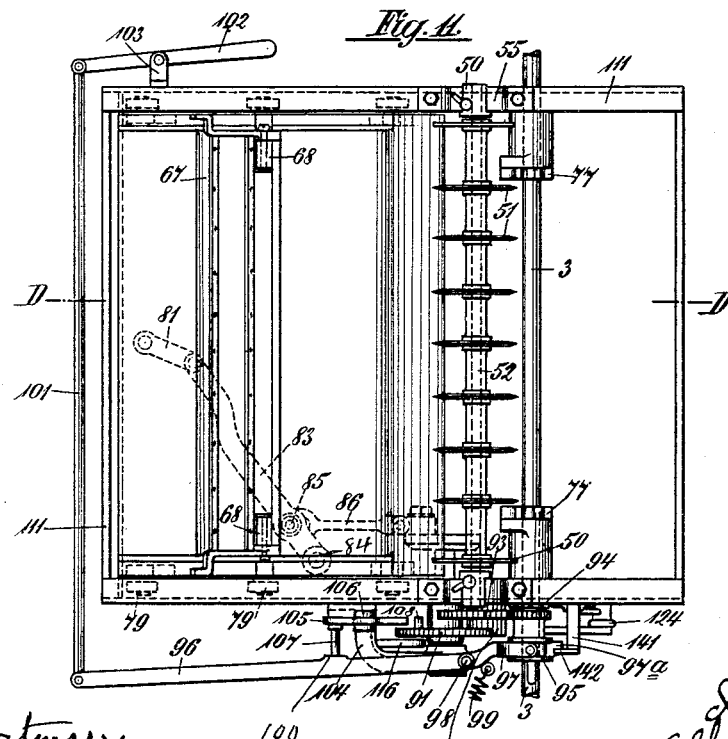

No. 733,164. PATENTED JULY 7, 1903.
A. CURRLE.
APPARATUS FOR WINDING FLAT STRIPS OF PASTE AND CUTTING SAME.
APPLICATION FILED MAY 16, 1902.
NO MODEL. 6 SHEETS—SHEET 5.
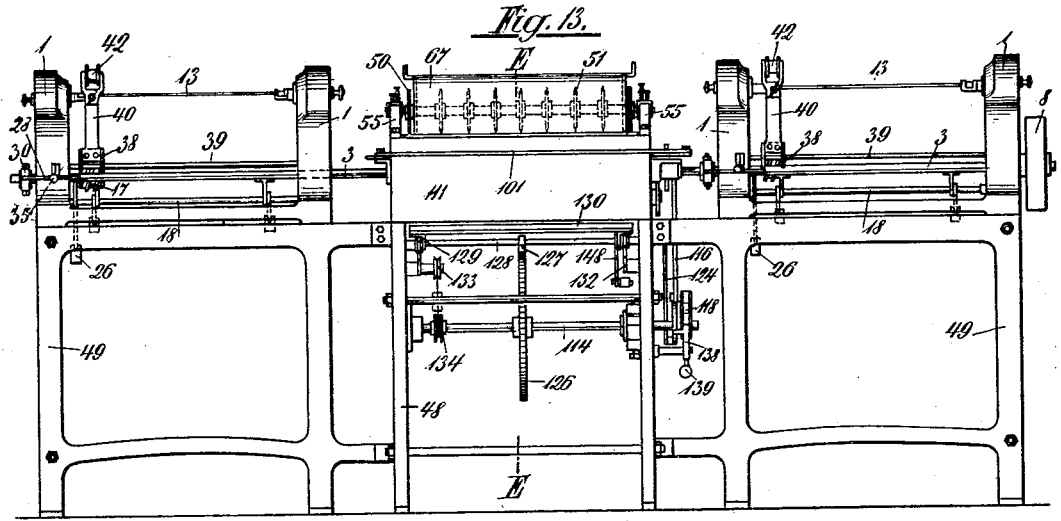
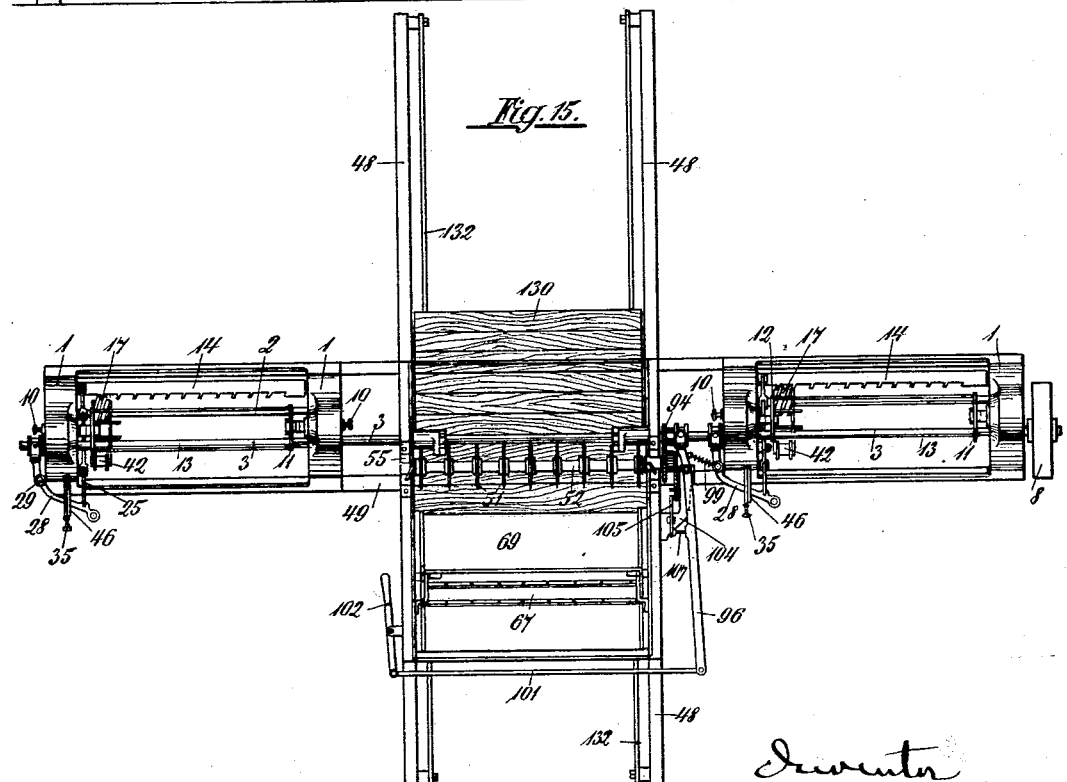

No. 733,164. PATENTED JULY 7, 1903.
A. CURRLE.
APPARATUS FOR WINDING FLAT STRIPS OF PASTE AND CUTTING SAME.
APPLICATION FILED MAY 16, 1902.
NO MODEL. 6 SHEETS—SHEET 6.
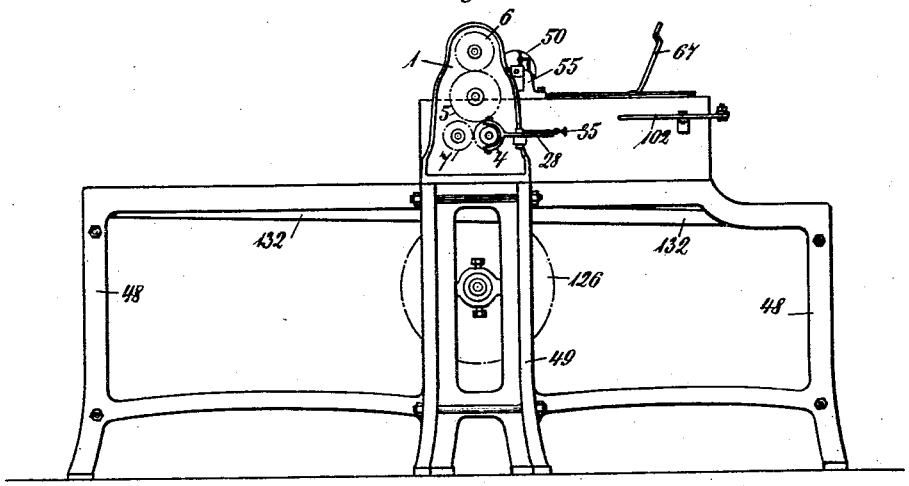
*Fig. 14.*
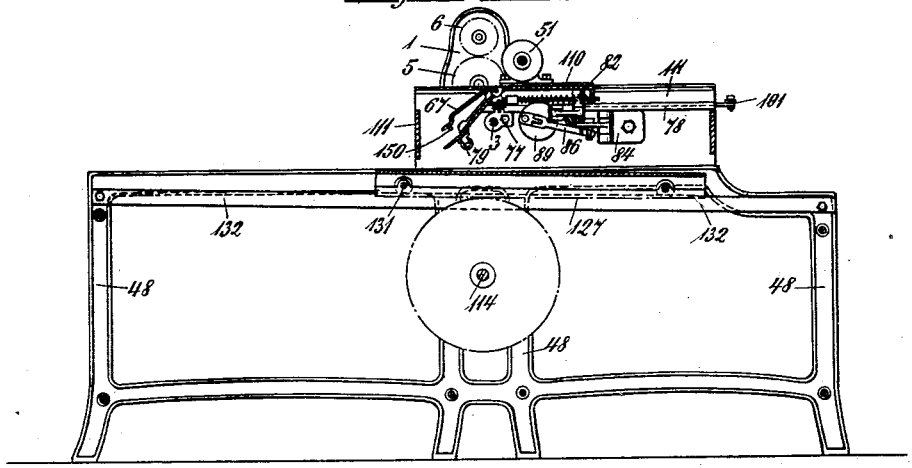
*Fig. 16. Section E-E.*

No. 733,164. Patented July 7, 1903.

UNITED STATES PATENT OFFICE.

ALBERT CURRLE, OF STUTTGART, GERMANY.

APPARATUS FOR WINDING FLAT STRIPS OF PASTE AND CUTTING SAME.

SPECIFICATION forming part of Letters Patent No. 733,164, dated July 7, 1903.

Application filed May 16, 1902. Serial No. 107,674. (No model.)

*To all whom it may concern:*

Be it known that I, ALBERT CURRLE, a citizen of the German Empire, residing at Stuttgart, in the Kingdom of Würtemberg, Germany, have invented certain new and useful Improvements in Apparatus for Winding Up Flat Strips of Paste and Cutting the Same, of which the following is a description, reference being had to the accompanying drawings and to the characters of reference marked thereon.

This invention relates to an apparatus for winding up the flat strips of paste coming from a paste-press, cutting up the wound strips after withdrawal, and placing the cut parts on frames or hurdles, which after they have been completely covered are removed and brought into the drying-room.

The machine consists, essentially, of one or more winding devices, in which the strip of paste, cut to a given length, is conveyed to a rotary winding frame or reel and when the reel is filled removed, with the frame, out of the machine and the wound strip or band laid on a carriage having a reciprocating motion, (cutting-carriage.) This carriage conveys the wound strip under a spindle which is set with a number of cutting-disks, and the latter cut the strip into pieces of equal width necessary for the subsequent packing, after which on the further movement of the carriage the cut strip falls onto a hurdle or drying-frame lying on a second carriage, (frame or hurdle carriage,) which is progressively moved forward automatically each time after receiving a cut piece of material to an extent corresponding to the width of the same until the frame is entirely covered, whereupon a fresh frame is placed on the carriage after the covered one has been removed and the carriage again automatically returned to its initial position. As the winding of the strip requires more time than is necessary for the cutting and laying of the same, a winding device is provided to the right and left of each cutting apparatus, each of which winding devices is attended to by a girl, while one cutting and laying apparatus suffices for both winding devices.

The machine is shown in the accompanying drawings in Figures 1 to 18.

Figs. 1 to 6 and 17 to 18 show in elevations and sections the winding apparatus. Figs. 7 and 8 are drawn on an enlarged scale and show the mounting of the cutting-spindle whereby it is allowed to automatically rise and fall before each cutting movement. Figs. 9 to 12 show the device which serves for cutting the wound strips removed from the winding apparatus and for placing the cut strips on the vermicelli-frames. Figs. 13 to 16 show two different elevations, a plan view and a vertical section of the complete machine, two winding apparatuses being assumed to be employed for one cutting apparatus. Fig. 17 is an enlarged detail end view of a portion of the mechanism shown in Fig. 3, but looking from an opposite direction. Fig. 17$^a$ is a detail section on line $x\ x$, Fig. 17. Fig. 18 is a sectional plan of the mechanism shown in Fig. 17.

The winding apparatus, Figs. 1 to 6, consists of a U-shaped frame 1, mounted on a framework 49, in the part of which frame 1 a winding-frame is removably mounted. This winding-frame consists of two cross-arms 11 and 12, in one of which a number of parallel reel-bars 13 are fixed, the ends of these bars being simply inserted in the other cross-bar. The rectangular cross-arms 11 and 12 of the winding-frame fit in suitable recesses in the ends of bushes 9, which are revolubly mounted in the frame 1, and on which equal-sized toothed wheels 6 are mounted, which are set in rotation by intermediate wheels 5 and toothed wheels 4, mounted on a shaft 2, also located in the frame 1. The shaft 2 is driven by means of its toothed wheels 4 gearing with toothed wheels 7, mounted on the main driving-shaft 3.

The winding-frame or rather its cross-arms 11 and 12 are held on the bushes 9 by means of inserted pins 10, and when the latter are drawn out the frame may be conveniently removed and the strip of vermicelli wound thereon easily removed, as one or both of the outer reel-bars 13 are pivotally mounted on the fastening-arm 11 in such a way that after withdrawal from the other cross-arm 12 the loose end of the said reel bar or bars can approach the adjacent reel bar or bars, (see Fig. 6,) and thereby diminish the distance between the said bars toward the removal end.

The winding on of the strip $w$ is effected by means of a guide-roller 42, Fig. 3, mounted on a bearing 41, which is vertically adjustable on a bar 40, fixed on the vertical arm of a slide 38. A fork on this slide engages over the two ends of a worm 17, which is mounted on the shaft 2 and is revoluble and displaceable thereon. A tooth 15 of a rack-bar 14 engages in the groove of the worm 17 in such a way that on the rotation of the worm 17 and the shaft 2 the worm at each revolution is axially displaced to the extent of one tooth or notch of the rack-bar 14. In this displacement the slide 38, which is guided by a separate rod 39, fixed in the framing 1, is also displaced—that is to say, the vermicelli-strip guide-roller 42 is also moved forward the extent of one tooth or interval. The rotating winding-frame 11 12 13 is in this manner wound with the strip, and after it has been wound full the rack-bar 14 is automatically thrown out of action and the rotary movement of the winding-frame is stopped in the following manner, Figs. 1 to 16:

The rack-bar 14 is held revolubly by means of supports 19 on a shaft 18, which is fixed in the frames 1 parallel to the shafts 2 and 3. Two elbow-levers 20, carrying weights 21 at their ends, are mounted on this shaft 18, and by means of these weights the rack-bar 14 and the teeth 15 are held in gear with the worm 17, Figs. 3 and 4. The rack-bar 14 is also connected with an elbow-lever 34, pivoted on a pin 37 by means of bearings 32, mounted on said rack-bar, and a connecting-rod 33, in one U-shaped arm of which elbow-lever one end of a lever 35 engages, which lever is pivoted on a pin 36, located in a projection of the frame 1, and bears against a projection situated beneath a further elbow-lever 28, which is pivoted on a pin 30 and engages, by means of its forked end 29, in a grooved collar 31 on the hub of the driving toothed wheel 7. The other arm of this elbow-lever 28 is connected with a weighted lever 25, pivotally mounted on a pin 27, carrying at its free end a weight 26, and connected with the rack-bar 14 by means of a cross-bar 22 and a bearing 24, mounted on the rack-bar 14. The lever 25, provided with the weight 26, exerts an action when released which throws the rack-bar 14 out of its engagement with the worm 17. Directly beside the lever 35 a second lever 46 is located, which is also pivoted on the pin 36 and engages one arm of the elbow-lever 34 in such a way that on its being turned the elbow-lever 34 is turned with it, while this is not the case when the lever 35 is turned. As can be seen from Figs. 17 and 18, both of the levers 35 and 46 are rotatably mounted on a bolt 36 of the frame 1. Each one is provided with a nose $46^a$ or $35^a$, displaced laterally from one another. The backward ends $46^b$ and $35^b$ of these levers 46 and 35 are thickened and rounded. They lie in the recess of a lever $34^a$, fixed upon a bolt 37, rotatably mounted on the frame 1. On the same bolt and at the inside of the frame 1 is provided a lever 34, directed downward, which by means of a rod 33 is connected to a nose 32 of the rack 14, rotatable on the bolt 18. The lever $34^a$ is of U section; but the lower rib is smaller—i. e., the part underneath the lever $35^b$ is cut away, Fig. $17^a$, so that the lever may be raised and the inner end $35^b$ pass from behind the lever $34^a$ without actuating the said lever $34^a$. If, however, the lever 46 is raised at its fore extremity, its inner end $46^b$ will engage the recess in lever $34^a$ and the lever $34^a$ is turned also. When releasing the lever 35, the nose $35^a$ of which leans against the lever 28, this lever is liberated from the said nose and is moved until it pushes against the nose $46^a$ of the lever 46, and the fork 29 of the lever 28 throws out of action the driving-gear 7, mounted on the shaft 3, so that the latter is no more in engagement with the toothed wheel 4, and the machine is stopped. The lever 28 when released is actuated by the action of the weighted lever 25, also connected with the rod 22. The coupling-rod 22 is displaced when the lever 28 is moved. The rod 22 is connected to a rack 14 or with an arm 24 of the same and is provided with a slot 23, permitting it to make a starting movement without actuating the rack 14; but when the lever 46 is raised its nose $46^a$ liberates the lever 28, and the same is turned under influence of the weighted lever 25, and simultaneously the rack 14 is brought out of engagement with the worm-wheel 17 by being turned around the bolt 18. The weight 26, fixed to the lever 25, is heavy enough to throw the rack 14 out of action in spite of its weighted lever 20.

The automatic release of the rack 14 from its engagement with the worm-wheel 17 takes place at the end of each stroke of the worm-wheel—i. e., after the paste-strip is completely wound up and the worm-wheel 17 pushes against the nose 16 of the rack 14— in which moment the lever $34^a$ is lowered and bar 33, levers 34 and $34^a$, 35 and 46 are set idle, thus causing the stopping of the machine.

The automatic releasing of the rack-bar 14 at the end of each winding is effected by means of the worm, which at the end of its forward movement encounters a projection 16 on the rack-bar and pushes the latter so far back that the teeth 15 of the bar come out of engagement with the groove of the worm, whereupon this latter, or rather the carriage 38, is returned to its initial position by means of a cord 43, connected with it, carried over a roller 45 and having a weight 44 at its end, while the rack-bar during this time is held fast in a disengaged position by means of the weight 26 of the lever 25 and is again brought into engagement with worm 17 by first pulling out lever 28 until the latch or nose $35^a$ of lever 35 drops behind it.

The winding apparatus works in the following manner: The shaft 3 is driven by means of a belt-pulley 8, mounted thereon, the winding-frame of the worm being set in rotation when the gear-wheel 7 is thrown into gear. The strip or band w, conducted over the roller 42, is suitably moved along axially by the worm 17, and when the winding is ended the rack-bar 14 is automatically disengaged by the worm, and simultaneously the two levers 35 and 46 are turned by the elbow-lever 34—that is to say, the lever which throws them out of action is released, the toothed wheel 7 is thrown out of gear, and the winding-machine brought to a standstill—whereupon the carriage 38, together with the guide-roller 42 and worm 17, are automatically returned to their initial position by the cord 43 and weight 44.

If the machine is only to be momentarily stopped during the winding, the lever 35 is raised to release lever 28 and cause it to shift the toothed wheel 7 without, however, throwing the rack-bar 13 out of gear. If the lever 46 be also raised, then the rack-bar is also thrown out of gear.

For removing the winding-frame for the purpose of drawing off the wound strip therefrom each time a throwing out of gear is necessary, which takes place automatically by means of the worm in the manner hereinbefore described, after which the lever 28 must always be again separately thrown into gear in order to again set the winding apparatus in action.

The strip of wound material, which, as shown in Fig. 6, may be easily removed, owing to the pivotal mounting of one of the outer winding-bars 13 in the cross-arm 11, is brought after removal to the cutting apparatus shown in Figs. 9 to 12. This consists of a cutting-shaft 53, having thereon a number of cutting-disks 51, held at equal distances apart by intermediate pieces 52, under which disks the wound strip of material is conveyed, lying under a cover 67 on a cutting-plate 69, the cover having slots for the passage of the knife-disks 51. The plate 69 and also the cover 67 are revolubly mounted on a carriage (cutting-carriage) 110, which travels on rollers 79, mounted on bearings 80 and resting on rails 78. After a lever 96, Fig. 11, has been operated so as to throw the apparatus into gear the carriage is moved by means of a pinion 94, mounted on a shaft 3 and adapted to be adjusted or displaced thereon, the forked end 97 of the lever 96 engaging over the coupling-collar 95 of the pinion 94. This pinion 94 gears with one wheel 93 of a double wheel, the other wheel 92 of which gears with a pinion 91, on the spindle 90 of which a crank-disk 89 is mounted, the crank-pin 88 of which is coupled by a cross-link 87 and connecting-rod 86 with a lever 83 for moving the cutting-carriage 110. The lever 83 is pivotally mounted on the center part 111 of the machine by means of bearings 84 and connected by a link lever 81 with a hub 82, mounted on the carriage 110. At each revolution of the crank-disk 89 and the cog-wheel or pinion 91 the lever 83, and thereby also the carriage 110, makes a reciprocating movement, and the cutting apparatus works in the following manner: The cover 67, or rather its frame 66, is pivotally mounted on pins 68 on the carriage 110 and has on one of its bearings a toothed segment 112, which when a carriage is entirely pushed back gears with a toothed segment 113, mounted on the frame 111, in which position the cover is entirely opened, Figs. 9 and 10. As soon as the strip of vermicelli has come onto the cutting-plate the carriage 110 is set in movement, the cover first automatically closing. The cutting-plate 69 is also pivoted on a spindle 71, which passes through projections 70, cast on the plate 69 and mounted on the carriage 110. It is also held in a given position by the spring-pressure of bars 75, also fixed on the projections 70, which rods 75 are carried through the rear vertical wall of the carriage and are surrounded by springs 76, which bear at one end on the collars 74 and at the opposite ends on said vertical wall of the carriage. On the under parts of the projections 70 toothed segments 72 are cast, which on the forward movement of the carriage after the cutting of the wound strip is completed come into engagement with two toothed segments 77, fixed on the frame 111, whereby toward the end of the vertical movement the cutting-plate 69 is turned obliquely, while the cover 67, by resting on two projections 150 of the carriage 110, is lifted so far from the plate 69 that the cut strip of wound material falls automatically on to the hurdle or frame, Fig. 16. On the return of the carriage the cutting-plate 69 is again returned to its normal horizontal position by the said toothed segments with the assistance of springs 76 and toward the end of the return movement. Also the cover 67 is again automatically opened by its toothed segments.

At each revolution of the pinion 91 the carriage 110 is automatically thrown out of action, a pawl 105, pivotally mounted on a pin 106, being raised by a pin 108, mounted on and laterally projecting from the pinion 91, a projection 100 on the lever 96 bearing against the laterally-projecting pin 107 of the pawl 105 when the cog-wheel 94 is thrown into gear. As soon as the pawl 105 is raised the lever 96 is no longer retained by the pins 107 and is pushed aside by a spring 99, bringing the cog-wheel 94 out of engagement with the cog-wheel 93, and consequently the latter and the pinion 91 become stationary. In order to again throw them into gear, it is necessary to first shift the lever 96, which may be done directly or also by means of a connecting-rod 101 and a lever 102, coupled therewith and pivoted at 103 on the other side of the machine.

In order that during the return of the carriage the runner-disks 50, mounted on both sides of the cutting-plate 69, may not rest on the said plate, the spindle 53 of the cutting-disks is vertically adjustable, and at each reciprocating movement of the carriage this spindle is automatically moved up or down. This is effected in the following way: The bearing-cups 54 of the spindle 53 are held adjustably in bearing-guides 55, screwed on the frame 111, and rest upon revoluble disks 59, provided at both ends with recesses, by means of screws 58 passing through the cups 54. The disks 59 have three notches 60, 61, and 62 therein, of which the upper one, 60, is intended for receiving the carrying-screws 58 of the spindle of the cutting-disks on the forward movement of the cutting-carriage 110, while the others, 61 and 62, are intended for turning and returning the disks 59 for the purpose of raising and lowering the spindle 53 of the cutting-disks. For the latter object projections 64 and 65 are arranged on the carriage, standing out at different intervals successively, which projections encounter the rollers 59 in passing under them in such a way that on the forward movement of the carriage—that is to say, when the spindle 53 is lowered—the flat projections 64 pass by in the segment-slot 62 under the rollers without revolving the latter, and this revolution is only effected at the last moment of the forward movement by means of the second projection 65, while the roller is turned into the position shown in dotted lines in Fig. 7. The screws 58 then come out of the notches 60 on the periphery of the rollers—that is to say, the spindle 53 is raised. In the then following return of the carriage 110 the rollers 59 remain in the dotted position, and the cutting-knife shaft is held raised until the projection 64 encounters the beveled faces of the notch 62, and the rollers again turn backward until the screws 58 stand in the notches 60 of the rollers 59—that is to say, the shaft of the cutting-disks is again lowered. The disks or rollers 59 are pivotally mounted in bearings 55 by means of their pin 63.

In order that in the case of any impediment to the cutting of the strip of wound paste the spindle of the cutting-disk may be able to lift, but yet be pressed on with a spring action, the screw 58 is guided above in a bent arm 56, fixed on the bearing-guides 55, and a spring 57, spirally surrounding the screw, is inserted between the cross-piece of this arm 56 and the bearing-cup.

The cut lengths of the wound substance are conveyed onto the hurdle from the cutting-plate 69 of the carriage 110 by the cutting-plate being placed in an inclined position, (see Fig. 16,) while the hurdle is laid on a transport-carriage 129, (hurdle-carriage.) This carriage consists of a frame 129, on the upper part of which bars 130 for receiving the hurdles are fixed. The carriage rests, by means of rollers 131, on rails 132, which are fixed on the frame 48 of the cutting-machine. The carriage 129 is shifted forward to the thickness of one strip of material after each cut piece of the wound material has been deposited thereon until the hurdle is completely covered. This is effected in the following manner: A rack-bar 127 is fixed in a cross-arm 128 on the carriage 129, in which rack-bar gears a pinion 126, mounted on a shaft 114, on which shaft is mounted a cord-pulley 134, from which depends a cord 135, carried over a roller 133 and having a weight 136 at its end, with the object of returning the carriage to its initial position as soon as a hurdle or drying-frame is filled or completly covered. A ratchet-wheel 118 is also mounted on the spindle 114, with which wheel a pawl 119 engages, which is mounted on a disk lever 134, pivoted on the spindle 114. The latter is connected with a double-armed lever 116 by means of a connecting-lever 117, the lever 116 being pivoted on a spindle 115 and at each revolution of the cog-wheel being turned so far by a laterally-projecting catch 109, mounted on the cog-wheel 91, that the ratchet-wheel 118 is moved forward to the extent of one tooth, and thereby the drying-frame or hurdle-carriage 129 is moved to the thickness of one strip of the material from the reel. A counter-pawl 138, pivoted at 139 and loaded by a counterweight 140, prevents the ratchet-wheel from turning backward.

In order to return the hurdle-carriage 129 into its initial position, a cam-wheel 121, revolubly mounted beside the ratchet-wheel 118 and connected, by means of a coupling-piece 123, with a lever 124, is also turned by the turning of the lever 124, whereupon its projecting cam 122 passes under the laterally-projecting catches of the pawl 119 and the counter-pawl 138, thus lifting the pawls up and releasing the teeth of the ratchet-wheel. A spring 137, acting on the lever 124, always brings it back into its normal position.

With the object of preventing any further shifting of the hurdle-carriage 129 after the hurdle lying on the carriage has been quite covered with the cut strips of paste an arm 148 is screwed on the carriage, which arm carries below a roller 149. This roller in the actual last shifting of the carriage passes under a lever 144, pivotally mounted on a pin 146 on the frame of the machine and loaded by a weight 147. (See Fig. 9.) The lever is coupled with a vertically-adjustable lock-lever 141 by means of a coupling-pin 145, said lever 141 having a catch 142 at the top, which when the lock-lever is pushed down passes behind the downwardly-prolonged arm 97$^a$ of the fork 97 of the disengaged lever 96 and allows the said lever to be thrown into gear, so that the cutting apparatus is started when the lock-lever is again released—that is to say, raised. This is effected on the return of the carriage 129 by the counterweight 147 of the lever 144 pushing the lock-lever 141 automatically upward after the roller 149 has released the same, when the projection 144 also again releases the fork 97 and the lever 96. The displacement of the lock-lever 141 only takes place at the last moment of the forward movement of the carriage, for which object a slot 143 is provided in the lock-lever, in which slot a coupling-pin 145 rests, so that the lever 144 can only make a short movement before the lock-lever comes into action.

As may thus be seen from the foregoing specification, the removal of the strip of wound material, the bringing of the same into the cutting apparatus, and the return of the hurdle-carriage after each hurdle has been completely covered with the cut strips must be done by hand, while the other processes are automatically effected.

I declare that what I claim is—

1. A machine for winding, cutting and placing flat strips of vermicelli paste on hurdles or drying-frames, comprising a guide-roller for the strip of paste having a constant progressive movement, a rotating winding-frame for receiving the paste, said frame being wound full and the wound strip then taken off, a cutting-plate upon which the wound strip is then placed, a carriage on which said plate is supported, a lid which automatically closes on the displacement of the carriage and holds the strip fast, a cutting-shaft having cutting-disks under which the cutting-plate is passed for the material to be cut, the cut strips on the completion of the forward movement of the carriage being discharged automatically by the inclination of the front part of the cutting-plate, a hurdle or drying-frame for receiving the discharged cut strips, a carriage on which the hurdle is supported, and means for intermittently moving forward said carriage and hurdle through the width of the wound strip.

2. In a machine for winding, cutting and placing flat strips of vermicelli paste on hurdles or drying-frames, a winding device comprising a number of winding-bars 13, a cross-arm 11 in which the ends of said winding-bars are fixed, a second cross-arm 12 in which the other ends of the winding-bars are inserted, bushes 9 having notches in which the cross-arms are inserted, winding-frame standards 1 in which said bushes are pivotally mounted, pins 10 by means of which said cross-arms are releasably held, toothed wheels 6 by means of which said bushes are set in uniform rotation, a guide-roller 42 for winding on of the strip of paste, a worm 17, a rack-bar 14 engaging with said worm and adapted to axially displace said guide-roller, the removal of the wound strip from the winding-frame being facilitated by one or both outermost winding-bars being pivotally mounted on a cross-arm 11.

3. In a machine for winding, cutting and placing flat strips of vermicelli paste on hurdles or drying-frames, a mechanism for automatically stopping the device for shifting the worm 17 and the roller 42 for guiding the strip of dough, which roller is displaced with the said worm after the winding on of the strip, and also for returning both into the initial position, characterized by the rack-bar 14 mounted in such a way as to be capable of being laterally displaced, and a projection 16 formed on the end of said rack-bar, against which projection the worm strikes when the winding on of the strip of dough is completed, and forces back the rack-bar 14 and brings it out of engagement with the worm 17 which is then returned to its initial position by a cord loaded with a weight after the lever 46 has been first raised by means of an elbow-lever 34 coupled with the rack-bar by a connecting-link 33, a projection on the lever 46 releasing a switching-off lever 28 which then is turned by means of a lever 25 coupled with it, and loaded with a weight 26 thus in turn operating the switching-off lever 28 and throwing the driving cog-wheel 27 out of gear, that is to say putting the winding device out of action.

4. In a machine for winding, cutting and placing flat strips of vermicelli paste on hurdles or drying-frames, a mechanism for stopping the winding device without throwing the rack-bar out of action, consisting of a lever 35 which retains a lever 28 by means of its projection, but when raised allows the latter to turn so far that a toothed wheel 7 is thrown out of gear, while a rack-bar 14 connected by a rod 22 with the lever 25 is not yet turned by the operation of the lever 35 in consequence of a slot 23 provided in the link 22.

5. In a machine for winding, cutting and placing flat strips of vermicelli paste on hurdles or drying-frames, a mechanism for cutting the strips, consisting of a carriage 110 having a reciprocating movement forward and backward, on which carriage a cutting-plate 69 and a cover 67 adapted to be shut down are so arranged that on the forward movement of the carriage 110 the cover is automatically closed, and the strip of paste previously laid on the cutting-plate is held fast, whereupon it is passed under the cutting-disks 51 and cut into lengths, and toward the end of the forward movement by one end of the cutting-plate being inclined forward, while the cover 67 is automatically held by catches 150, the strip of paste is thrown onto a hurdle lying beneath, and on the return of the carriage the cutting-plate is again raised, and toward the end of the return movement the cover is automatically opened.

6. In a machine for winding, cutting and placing flat strips of vermicelli paste on hurdles or drying-frames, a mechanism for automatically stopping the carriage 110 after each reciprocating movement, consisting of a projection 108 formed on the change gear-wheel 91 which projection or cam on the rotation of the wheel encounters a pawl 105, turns the latter, and lifts a pin 107, releasing thereby a releasing-lever 96 which is operated by a spring 99 and throws the cog-wheel 94 out of action.

7. In a machine for winding, cutting and placing flat strips of vermicelli paste on hurdles or drying-frames, a mechanism for lifting the cutting-disks 51 during the return of the carriage 110, consisting of two disks 59 revolubly mounted on bearings 55 and each provided with notches 60, 61 and 62, on which disks 59 the set-screws carrying the bearing-cups are mounted in such a way that on the forward movement of the carriage they lie in notches 60 of the disks 59, that is to say the cutting-disks are lowered, and only at the end of the forward movement are raised by projections 65 on the carriage encountering the disks and causing a rotation of the same, whereby the disks are held in a raised position until on the return of the carriage the projections 64 also on the carriage again turn back the disks and the ends of the screws again are seated in the notches 60 of the disk 59.

8. In a machine for winding, cutting and placing flat strips of vermicelli paste on hurdles or drying-frames, a mechanism for automatically pushing forward the hurdle-carriage 129, consisting of a rack-bar 127 attached to the said carriage, with which rack-bar a pinion 126 gears which is fixed on a shaft 114 on which a ratchet-wheel 118 is mounted, which at each reciprocation of the carriage and each revolution of the pinion 91 is moved forward one tooth by its catch 109 encountering a lever 116 by means of a rod 117 and pawl 119, each toothed interval corresponding to the extent of the forward movement of the hurdle-carriage for each breadth of the strip of wound material.

9. In a machine for winding, cutting and placing flat strips of vermicelli paste on hurdles or drying-frames, a mechanism, for returning the hurdle-carriage 129, consisting of a cam-disk 121 loosely revoluble on the shaft 114, and provided with a projecting cam 122, said cam-disk 121 being connected with a lever 124, the part of the disk 121 which projects radially further passing under the lateral projecting ends of pawls 119 and 138 thus preventing them from engaging with the notches of the ratchet-wheel 118 in such a way that the carriage is no longer retained, but is allowed to be returned by the weight 136 into its initial position, while a spring 137 acting on the lever 124 turns the same so far that the pawl again lies in the notches of the cam-disk 121.

10. In a machine for winding, cutting and placing flat strips of vermicelli paste on hurdles or drying-frames, a mechanism for preventing the cutting arrangement from being started and the hurdle-carriage 129 moved forward when the hurdle or drying-frame has been completely covered with pieces of the strip, consisting of a stop-lever 141 vertically adjustable and provided with a projecting nose 142 which lever is coupled below with a revoluble lever 144 loaded by a weight 147 under which lever 144 a roller 149 arranged on the carriage 129 passes at the end of the last shifting of the hurdle, and raises the lever, causes it to draw down the lock-lever and bring its nose behind one arm $97^a$ of the fork 97 of the disengaged lever 96 which throws the arrangement out of gear in such a way that the toothed wheel 94 can only be again thrown into gear after it is possible to release the stop-lever which is lifted automatically after the drawing back of the carriage by the lever 144.

In testimony whereof I affix my signature in presence of two witnesses.

ALBERT CURRLE.

Witnesses:
 AUGUST DRANTZ,
 WM. HAHN.